May 19, 1931.            C. L. ACKERMAN                1,806,139
                     MIXING MACHINE FOR PASTRY
                      Filed July 17, 1929        2 Sheets-Sheet 1
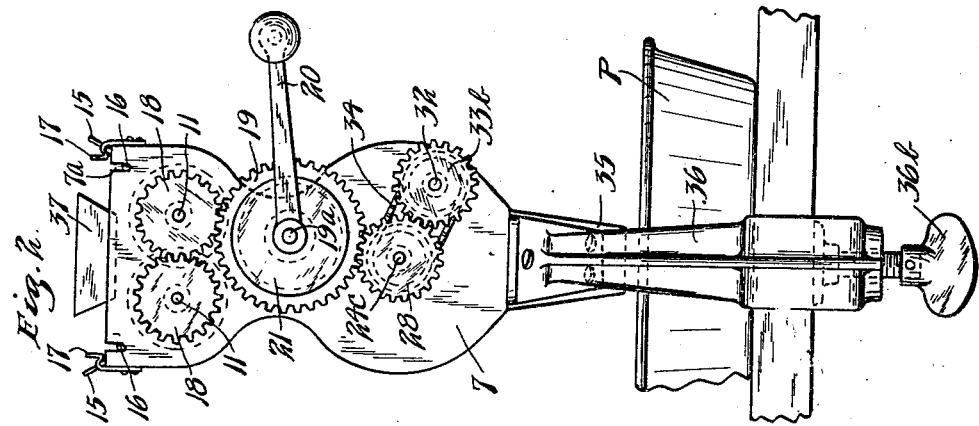
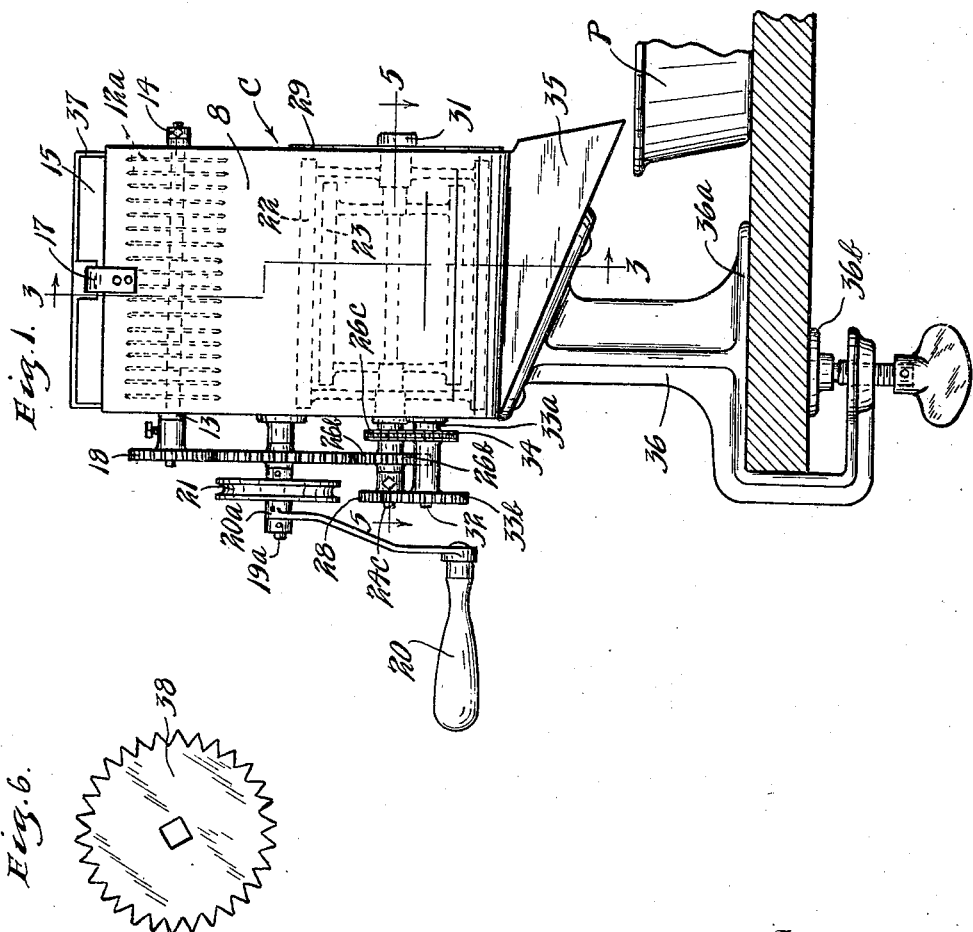
INVENTOR.
CATHERINE L. ACKERMAN
BY HER ATTORNEYS.

May 19, 1931.  C. L. ACKERMAN  1,806,139
MIXING MACHINE FOR PASTRY
Filed July 17, 1929   2 Sheets-Sheet 2
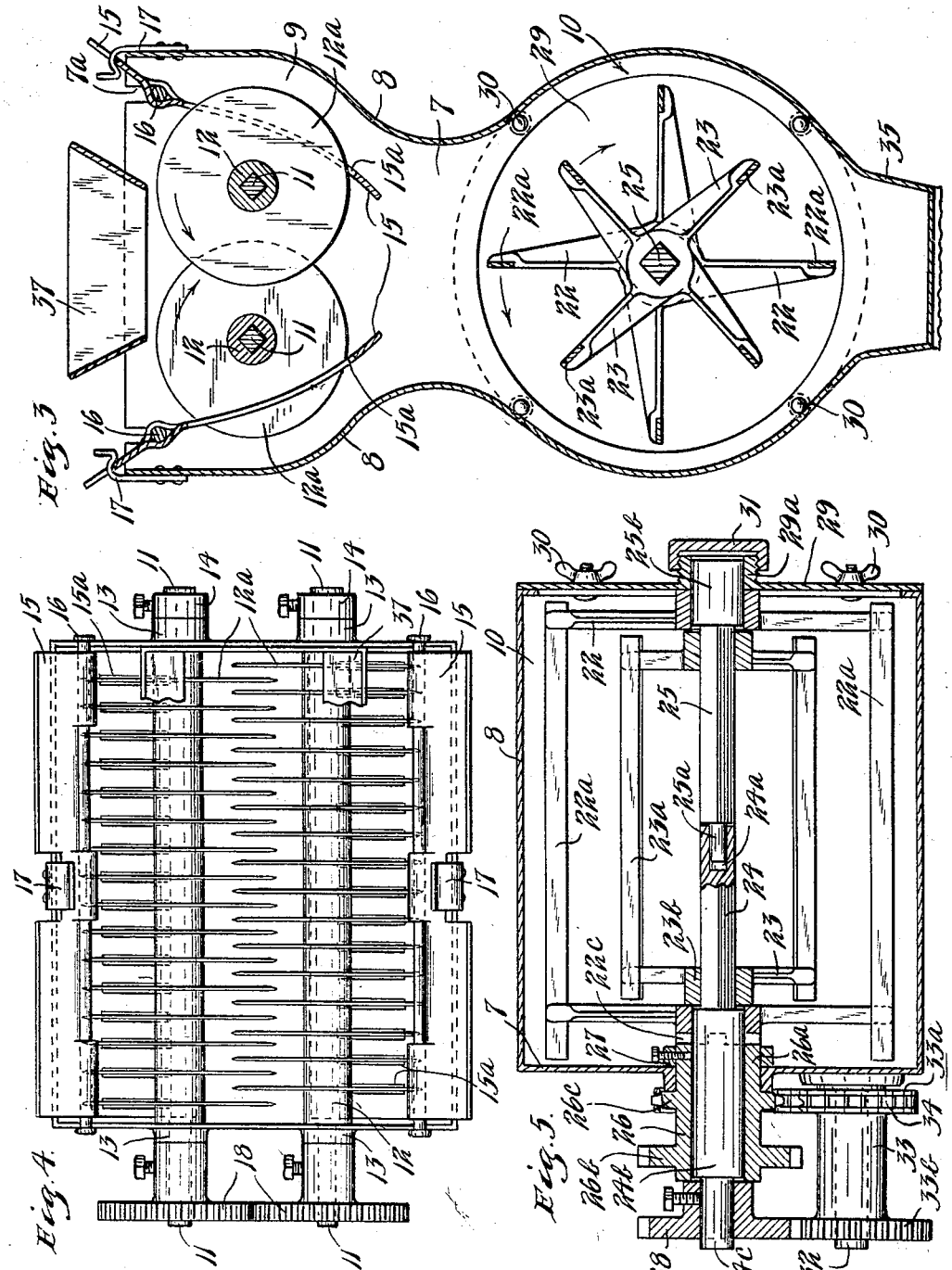
INVENTOR.
CATHERINE L. ACKERMAN
BY HER ATTORNEYS.

Patented May 19, 1931

1,806,139

UNITED STATES PATENT OFFICE

CATHERINE L. ACKERMAN, OF MINNEAPOLIS, MINNESOTA

MIXING MACHINE FOR PASTRY

Application filed July 17, 1929. Serial No. 378,938.

This invention relates to mixing machines and especially to pastry mixers.

In the making of pie crusts, cakes and other pastries, to obtain highly successful results, it is necessary to thoroughly mix the shortening material with the flour. A very thorough mixture of said two ingredients produces a delicious crisp, flaky product, which cannot be otherwise obtained. A thorough mixture of the shortening and flour cannot be effected by hand or by devices known to me at this time.

It is an object of my invention, therefore, to provide a comparatively simple but highly efficient mixing machine for thoroughly mixing the shortening and flour for making pastries and which will function to properly mix a maximum amount of material in a relatively short time.

It is a further object to provide a pastry mixer adapted to rapidly and continuously cut as well as mix the shortening material and flour for making pastry, delivering the mixed product at one end of the machine.

These and other objects and advantages of the invention will be fully set forth in the following description made in connection with the accompanying drawings in which like reference characters refer to similar parts throughout the several views and in which, Fig. 1 is a side elevation of an embodiment of my invention attached to the edge of a table and adapted to deliver the mixed material to a pan;

Fig. 2 is a front elevation of the same;

Fig. 3 is a vertical section on a larger scale, taken on the line 3—3 of Fig. 1;

Fig. 4 is a top plan view of the device, a substantial portion of the feeding hopper being broken away;

Fig. 5 is a horizontal section taken on the line 5—5 of Fig. 1, showing the construction of the concentric beaters; and Fig. 6 is a plan view showing a slightly different form of cutting element which I may employ if desired.

As shown in the drawings, my mixing machine includes a vertically disposed casing, designated as an entirety by the letter C having vertical ends 7 and curved sides 8, the opposing sides 8 being curved inwardly slightly above their central portions to form an upper or cutting chamber 9. The lower portion of casing C is substantially cylindrical constituting a beating chamber 10. Within the upper or cutting chamber 9 a pair of cooperating rotary cutters are disposed in parallel relation and horizontally alined. Each of said rotary cutters 9', as shown, is mounted on a square shaft 11 and comprises a sleeve 12 surrounding said shaft and fixed thereto, said sleeves being journaled in the vertical ends 7 of casing C. A series of circular cutting elements 12a are fixed to each of the sleeves 12 and the two series are staggered and overlap substantially, in order to cooperate in an efficient manner. Suitable external bearings 13 are provided in the vertical walls 7 of casing C to receive sleeves 12 and set collars 14 are detachably fixed to the rearwardly projecting ends of square shafts 11. The outwardly disposed portions of the two series of rotary cutting elements project through a pair of cooperating spring stripper members 15, suitable slots 15a being formed in said stripper members for the reception of the cutting elements. Stripper members 15 are in the form of rectangular spring plates inclined inwardly and oppositely, and connected adjacent their upper edges to rods 16, which rods are seated in suitable vertical slots 7a formed in the opposed vertical walls 7 of the casing. The upper edge of each stripper plate 15 is engaged by a suitable spring clip 17 secured to one of the sides 8 of the casing, clips 17 holding the stripper plates inwardly in proper operative position with the lower edges of said plates spaced a sufficient distance apart in the restricted medial portion of the casing to permit passage of material therethrough and to cause the cut material to fall into the central portion of the beating chamber 10 therebelow.

The forwardly projecting ends of cutter shafts 11 have fixed thereto a pair of meshed gears 18 in order that the two series of cutting elements may be driven toward each other in reverse direction and one of said gears 18 is meshed with a larger driving gear 19 rotatively mounted on the forward end 7 of the casing by suitable means, and provided, as shown in full lines, with a crank handle 20. Crank handle 20, as shown, has a socket 20a which may be keyed to a suitable shank or shaft 19a of driving gear 19 and if desired the device may be driven by a motor by detaching the socket 20a and substituting a driving pulley or sprocket 21, as illustrated in dotted lines in Fig. 1.

Within the lower beating chamber 10 of the casing I provide a pair of concentric beaters 22 and 23 respectively. The axis of said beaters being horizontal and passing through the vertical ends 7 of the casing. Each of the beaters comprises a pair of spaced spider frames having secured thereto a plurality of horizontally extending beater bars numbered 22a on the larger beater 22 and 23a on the smaller beater.

The smaller or inner beater 23 has its forward or left hand spider 23b fixed to the square inwardly projecting portion of a stub shaft 24. The inner extremity of stub shaft 24 may be provided with a socket 24a adapted to receive a diminished pin 25a projecting from the inner end of a stub shaft 25, the rear or right hand spider of beater 23 being keyed or otherwise fixed to square stub shaft 25. A driving sleeve 26 is journaled in a suitable bearing 26a provided in the forward end 7 of the casing and is disposed concentrically with beaters 22 and 23, being rotatably locked to said casing by a set collar 27. Stub shaft 24 has an intermediate enlarged cylindrical portion 24b which is rotatably telescoped within driving sleeve 26 and the forward extremity of the stub shaft 24 is diminished at 24c and projects beyond driving sleeve 26 and has fixed thereto a reversing gear 28.

The forward spider or left hand end of the larger beater 22 is loosely mounted on the inner end of the cylindrical portion 24b of the stub shaft 24 and is provided with clutch dogs 22c which mesh with suitable dogs provided on the inner end of driving sleeve 26 (see Fig. 5).

The rear spider or right hand end of beater 22 is loosely mounted on an enlarged cylindrical portion 25b carried by the outer end of stub shaft 25 and the outer extremity of cylindrical portion 25b is journaled in a suitable bearing 29a provided in a cylindrical plate 29 which is detachably secured by suitable means, such as the wing nuts 30 to the rear end of the beating chamber 10. The bearing 29a may be externally threaded to receive a cap 31.

The larger beater 22 is driven by means of a gear 26b fixed to the outer portion of driving sleeve 26, said gear being meshed with the large driving gear 19 mounted on the forward end of casing C. A stub countershaft 32 is suitably mounted on the forward end 7 of the casing spaced a short distance from stub shaft 24 and on stub countershaft 32 a reversing sleeve 33 is loosely mounted, driven in the same direction as driving sleeve 26 by means of a chain or other endless driving member 34 which is trained about sprockets 26c and 33a fixed to driving sleeve 26 and reversing sleeve 33 respectively. A reversing gear 33b is fixed to the outer end of reversing sleeve 33 and is meshed with the gear 28 connected to stub shaft 24. By the driving mechanism above described, the smaller or inner beater 23 is driven at the same rate of speed and in the opposite direction relative to the larger beater 22.

Casing C has a bottom opening which is enclosed by a suitable forwardly inclined delivery chute 35 and a suitable clamping device, designated as an entirety by the numeral 36, is secured to delivery chute 35 or if desired, to the casing, and as shown, is provided with a fixed jaw 36a and a screw-operated clamping member 36b adapted to cooperate with said fixed jaw to clamp my device to the horizontal edge of a table or shelf.

I prefer to provide a centrally disposed feeding hopper 37 extending longitudinally of and above the cooperating cutting elements at the upper end of casing C.

A pan P is illustrated in Figs. 1 and 2 of the drawings receiving from the delivery end of my mixing machine.

Operation

The operation of my improved mixing machine for pastry may be briefly described as follows:—

The requisite amount of shortening material, such as lard, butter or oil, and flour are poured together in a pan or other container and primarily mixed with a spoon or with the hands. The material is then poured or otherwise disposed, a little at a time, into the feeding hopper 37 while the crank handle 20 is being turned. The two series of cutter elements 12a are rotated oppositely and inwardly, as indicated by the arrows in Fig. 3, thereby drawing the material between the cutters and slicing and mulching the material simultaneously focing the same downwardly with the aid of gravity. Stripper plates 15, of course, prevent material from collecting on the cutter discs and are sufficiently resilient to prevent injury to the cutters, or the strippers. The material is guided by the lower edges of stripper plates 15 and dropped above the rapidly rotated beaters 22 and 23 centrally of casing C. Beaters 22 and 23 driven in opposite directions by the driving mechanism, previously described, receive the dropped material and beat and shear the same in their rapid rotation. The material is thus spread out against the cylindrical portions of casing C and is also sheared by the cooperation of the beater plates and then falls on the bottom of the sharply inclined chute 35 and is delivered rearwardly of the machine and may be collected in a pan of other suitable receptacle.

I have invented and constructed my device in such a manner that all of the working parts may be easily and quickly removed for cleaning. By releasing the spring engagement between clips 17 and the upper edges of stripper plates 15 and by swinging the lower portions of the plates outwardly, the stripper plate rods with the plates may be lifted from the casing. Set collars 14 may then be quickly released from the rear ends of square shafts 11 and the said shafts 11 with the gears 18 thereon removed from the opposite or front end of the casing. The sleeves 12 with the cutter discs thereon may then be lifted out of the upper compartment 9 of casing C, the feeding hopper 37, of course, being first removed.

To remove the beaters 22 and 23 for cleaning, it is first necessary to release the wing nuts 30 on cylindrical plate 29, remove the plate and then remove stub shaft 25. The two beaters may then be withdrawn through the aperture in the rear end of said compartment 10 and the beaters are of such size and shape that the smaller beater may be slipped through the larger beater when the beaters are free from their respective shafts or other means on which they are rotatably mounted.

The form of cutter disc 38 having the saw teeth thereon, illustrated in Fig. 6, may be substituted for the disc 12a if desired and is preferable for mixing some materials.

When my machine is used to mix soft plastic material, such as pastry and flour or dough, the material will be cut into depending strips by the co-operating cutter elements 12a and the depending strips will be continuously sheared of, beaten and rubbed against the side of beating chamber 10 by means of the cooperating beater members 22 and 23.

From the foregoing description it will be seen that with my mixing device the material is finely chopped or cut when first entering the machine, drops into a rapidly rotating beater which spreads, shears and mulches the falling material, delivering the same with the aid of gravity to the inclined chute 35. It is, of course, contemplated that my device is adapted for wide general usage where it is desired to mix and disintegrate material. My device is especially adapted for very thoroughly mixing shortening and flour in the making of pastry and when used in such capacity, the device has demonstrated a high degree of success. Said ingredients are so thoroughly cut and mixed that when the pastry is made it will have that flaky, crisp consistency which is desirable.

It will, of course, be understood that various changes may be made in the form, details, arrangement and proportions of the parts without departing from the scope of applicant's invention.

What is claimed is:

1. In a mixing machine, a casing having a receiving end and a delivery end, inner and outer, concentric, cooperating beaters in said casing each having circumferentially arranged horizontal beater bars, said inner beater being slidably fixed upon a joined two-piece shaft, one piece of said shaft being journaled in one side of said casing, a removable plate attached to an apertured portion of the opposite side of said casing and having a bearing wherein the other piece of said shaft is journaled, said outer beater being loosely mounted on said shaft within said casing and removable from said casing through said apertured portion thereof, and means for driving said beaters in opposite directions.

2. In a mixing machine, an upright casing having an upper receiving end, a pair of spaced horizontal cutters revolubly mounted in the upper portion of said casing and having spaced overlapping circular cutting elements, means for driving said cutters in opposite directions to cause material to be forced downwardly between said cutters, said material being cut in strips and depending from said cutter, and a beater below said cutters having a horizontal axis, said beater having a series of circumferential spaced horizontal beater bars adapted to intermittently shear said strips of material transversely and beat the same against a portion of said casing.

3. In a mixing machine, an upright casing having an upper receiving end, two series of rotary cutter elements mounted in said receiving end on horizontal axes, the ends of the opposite elements being overlapped and staggered, the outer edges of said elements working in slotted resilient stripper plates which diverge from opposite sides of said casing inwardly at their lower edges and are supported at their upper edges, and a rotary beater spaced some distance below said cutting elements and rotated on an axis parallel with the axes of said cutting elements.

4. In a mixing machine, a casing having an upper receiving end, two series of cooperating cutting elements in said receiving end mounted on horizontal axes and adapted to cut material into thin vertically depending strips, a chamber below said cutting elements wherein said strips may depend and a rotary beater below said chamber having a series of straight horizontal circumferentially spaced beater elements for intermittently shearing off said depending strips and for beating the sheared portions against the sides of said chamber.

5. In a mixing machine, a casing having an upper receiving end, two series of cooperating cutting elements in said receiving end adapted to cut material into thin strips, a chamber below said cutting elements wherein said strips may depend vertically, and a rotary beater rotating on a horizontal axis below said chamber and adapted to continuously shear off said depending strips, said rotary beater comprising a pair of cooperating rotary members moving in opposite directions and each having a series of horizontal circumferentially spaced shearing bars adapted to intermittently cut said strips on horizontal lines and beat the cut portions against the sides of said chamber.

In testimony whereof I affix my signature.

CATHERINE L. ACKERMAN.